United States Patent Office 3,523,869
Patented Aug. 11, 1970

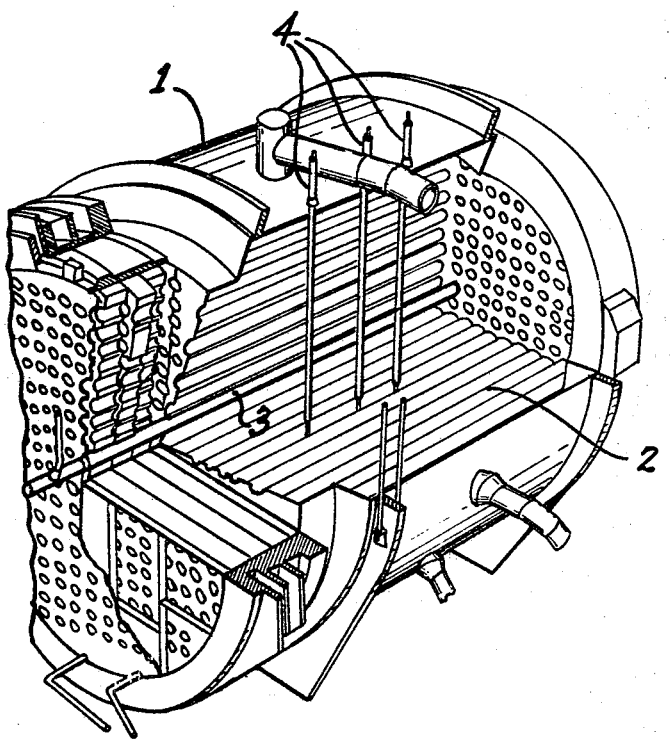

3,523,869
BOOSTER-SOURCE RODS IN HEAVY WATER MODERATED REACTOR
John W. Hilborn, Pinawa, Manitoba, Canada, assignor to Byk-Gulden Lomberg Chemische Fabrik G.m.b.H., Constance, Germany, a company of Germany
Original application Sept. 9, 1966, Ser. No. 578,344. Divided and this application Oct. 3, 1967, Ser. No. 675,748
Int. Cl. G21c 3/00
U.S. Cl. 176—144  2 Claims

ABSTRACT OF THE DISCLOSURE

A rod for insertion in the active lattice of a uranium fueled, heavy water moderated nuclear reactor for providing a source of neutrons for start-up of a reactor and additional reactivity during full power operation, the rod consisting essentially of a mixture of beryllium and plutonium 239.

---

This application is a division of my prior application Ser. No. 578,344, filed Sept. 9, 1966, now abandoned.

The present invention relates to the use of plutonium-beryllium rods in nuclear reactors, and in particular, to their use in uranium fuelled heavy water moderated power reactors.

One of the critical aspects of the operation of nuclear reactors is the control of reactivity during start-up. In a heavy water moderated nuclear reactor, reactivity can be controlled by varying the level of the moderator with respect to the fuel elements; hence control can be achieved by raising and lowering the moderator level in the reactor tank. When a reactor is operating at constant power its reactivity is unity; that is, the neutron flux in the reactor remains constant, and can be controlled by minor adjustments of the moderator level. During start-up, the reactivity is greater than unity, since the neutron flux is increasing to its operating level. It is desirable, during start-up, to control reactivity very closely, so that neutron multiplication in the core does not occur too rapidly, and cause damage to the reactor. The control of the reactor during the start-up phase is thus very critical, and a great deal of time and effort have been spent in developing instruments and controls for ensuring that the reactor is safe and stable.

An important problem which raises during reactor start-up is the provision fo a source of neutrons within the reactor, for starting the fission reactions and for ease of instrumentation during start-up. If a neutron source of sufficient strength can be inserted into the core of the reactor, then external neutron detectors may be used to control the reactor over the entire range, from start-up to full power. The alternative is to use additional detectors which can be temporarily inserted in the core during the low power phase of start-up, and then removed at high power. The external detectors are of course still necessary for full power operation. The installation of movable in-core detectors requires leak-proof tubes penetrating the reactor shielding and vessel. In addition, power supplies, pulse counting equipment, alarm devices and safety interlocks are required. Such an installation is costly, and can lead to serious problems of safety and reliability.

In the particular case of a heavy water moderated reactor, the problem of providing a neutron source arises only when the reactor is being started up for the first time. If a heavy water moderated reactor has been operating for several weeks at full power and is then shut down, a powerful neutron source already exists, arising from the action of fission product gamma rays on deuterium atoms in the heavy water. It is therefore unnecessary to introduce an additional source of neutrons for subsequent start-ups. However, in the case of a reactor which does not contain heavy water, a neutron source is usually required for every start-up; and in the case of a heavy water reactor, a neutron source is a great convenience during the commissioning period when the reactor is being started up for the first time.

If a reactor is shut down after it has been operating for some time, a phenomenon known as xenon poisoning occurs, which prevents restarting of the nuclear reactor. Immediately after shutdown the concentration of xenon increases, and absorbs neutrons to such a degree, that the reactivity of the reactor cannot be made to exceed unity. Accordingly, it is common practice to provide "booster-rods" which can be moved in and out of the core. These rods contain fissile material, and thereby supply the additional reactivity required to compensate for xenon poisoning during the start-up of a reactor recently shut down.

The present invention provides a dual purpose "booster-source-rod" which can be inserted in the core of a nuclear reactor. It will provide additional neutrons for start-up, and additional reactivity to compensate for xenon poisoning. In accordance with the present invention, a booster source rod contains a plutonium beryllium mixture, which at start-up will produce fast neutrons from an (alpha neutron) reaction in beryllium, and at full power will provide additional reactivity from fission in plutonium. A plutonium-beryllium mixture has several advantages: plutonium-239 has a half life of $2.4 \times 10^4$ years, and is an emitter of energetic alpha particles and weak gamma rays; beryllium has a high thermal conductivity and a reasonably high melting point.

The plutonium-berryllium mixture may be formed either as an alloy, or as a powder mixture. The maximum neutron yield from berryllium is approximately 60 fast neutrons for each $10^6$ alpha particles produced by the plutonium (Runnals and Boucher (1956) Can. J. Phys. 34: 949). Accordingly, one gram of plutonium-239 will produce approximately $10^5$ neutrons per second, when mixed with berryllium in a suitable manner. For a high yield of neutrons, it is recommended that the Be to Pu atom ratio be 100:1 or greater. In accordance with current reactor practice, the plutonium-beryllium mixture would most likely be contained in a sealed can, made of a durable metal such as stainless steel.

Numerous advantages are obtained by use of these plutonium-beryllium booster source rods. The principal advantage is that special in-core counters and other start-up instrumentation will not be required, and it will be possible to use conventional ion chambers located outside the core to cover the entire flux range from initial start-up to full power. A second advantage is that two essential requirements of reactor operation are fulfilled with a single device. A potential advantage is that as plutonium becomes plentiful and cheap in the future, reactors using it will have lower costs.

In order to illustrate the present invention with a specific example, consideration will be given to the CANDU power reactor. The core designed for this reactor provides eight booster rods incorporating a total of 3,483 grams of uranium-235. By replacing the uranium-235 with plutonium-239 and an appropriate amount of beryllium, a neutron source of approximately $3.5 \times 10^8$ neutrons per second would be available. This source is greater than the spontaneous fission source in the entire charge of uranium oxide fuel by a factor of approximately 500. It is also equivalent to the production of neutrons from a fission source of $4.5 \times 10^{-3}$ watts, which corresponds to approximately $0.6 \times 10^{-9}$ of the full power of the reactor. Conventional neutron ion chambers can be located outside the core to produce $200 \times 10^{-6}$ amperes when the reactor is at full power. When the reactor is shut down, the plutonium beryllium neutron sources will cause these ion chambers to produce $$0.6 \times 10^{-9} \times 200 \times 10^{-6} \text{ amps}$$

which is approximately equal to $10^{-13}$ amps. If it is assumed that the minimum useful output current from the ion chambers is $10^{-12}$ amperes, then it would only be necessary to increase the neutron source flux by a factor of 10. This increase can be achieved by making use of subcritical multiplication of the neutron source. That is, if by calculation and design, the reactivity of the core can be brought to 0.90 at the commencement of reactor operation, any source of neutrons inserted in the core will be multiplied by a factor of $$\frac{1}{1-0.90} = 10$$

The system can be envisaged as a neutron amplifier with a gain of 10, where the amplification arises from chain reactions in fissible material.

The accompanying drawing illustrates a nuclear reactor utilizing booster rods in accordance with the present invention. The reactor consists of a calandria 1 fitted with a number of calandria tubes such as 2, in which fuel elements 3 are contained. The reactor is also provided with a moderator, and appropriate controls (not shown). In accordance with the invention the reactor is fitted with a plurality of booster rods 4 containing a mixture of beryllium and plutonium 239 which booster rods are inserted in the reactor during start-up to provide additional reactivity and serve as booster rods during full power operation. Each booster rod can be moved in and out of the reactor core in a controlled manner whenever required.

I claim:

1. In a nuclear reactor of the type which comprises a plurality of uranium fuel rods and a heavy water moderator, the improvement in combination therewith which comprises; at least one booster-source rod consisting essentially of an alloy of beryllium, and plutonium 239 to provide a source of neutrons during the initial start-up, to permit the use of external neutron detectors to control the reactor over the entire range of operation from start-up to full power, to compensate for xenon poisoning in subsequent start-up operations, and to provide additional reactivity during full power operation.

2. In a nuclear reactor as claimed in claim 1, the atom ratio of beryllium to plutonium 239 being at least 13 to 1.

References Cited

UNITED STATES PATENTS

| | | | |
|---|---|---|---|
| 2,592,115 | 4/1952 | Carroll | 250—106 |
| 2,826,495 | 3/1958 | Spedding et al. | 75—122.7 |
| 2,875,041 | 2/1959 | Runnalis | 75—122.7 |
| 2,936,277 | 5/1960 | MacNeil et al. | 176—86 X |
| 2,938,784 | 5/1960 | Spedding et al. | 75—122.7 |
| 3,073,768 | 1/1963 | Richmond et al. | 75—122.7 |
| 3,086,929 | 4/1963 | Tunnicliffe | 176—44 X |

RUEBEN EPSTEIN, Primary Examiner

U.S. Cl. X.R.

176—86

PO-1050
(5/69)

UNITED STATES PATENT OFFICE
CERTIFICATE OF CORRECTION

Patent No. 3,523,869     Dated August 11, 1970

Inventor(s)     JOHN W. HILBORN

It is certified that error appears in the above-identified patent and that said Letters Patent are hereby corrected as shown below:

In column 1, in the ownership information section, delete "Byk-Gulden Lomberg Chemische Fabrik G.m.b.H., Constance, Germany, a company of Germany" and substitute therefor --Atomic Energy of Canada, Ltd., Ottawa, Ontario, Canada, a corporation of Canada--.

SIGNED AND
SEALED
DEC 29 1970

(SEAL)
Attest:

Edward M. Fletcher, Jr.
Attesting Officer

WILLIAM E. SCHUYLER, JR.
Commissioner of Patents